3,121,127
ARRANGEMENT FOR WET PURIFICATION AND EVAPORATIVE COOLING OF HOT GASES
Ingemar Hedin, Jonkoping, Sweden, assignor to Aktiebolaget Svenska Flaktfabriken, Stockholm, Sweden
Filed Dec. 26, 1961, Ser. No. 162,152
3 Claims. (Cl. 261—22)

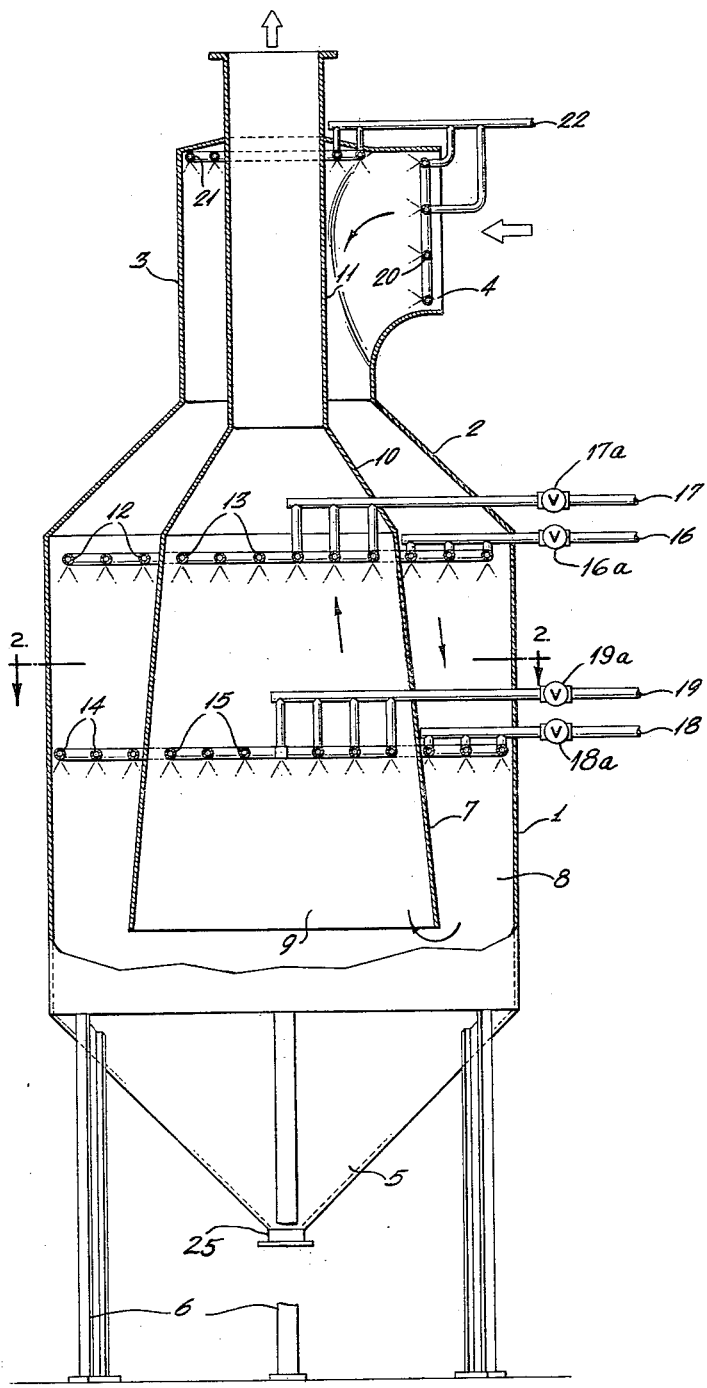

The present invention relates to an arrangement for wet purification and evaporative cooling of hot gases, consisting of a closed chamber provided with an inlet and an outlet for the gas to be purified, means for supplying and atomizing a washing liquid, and a drain for surplus liquid. In order to provide an effective treatment, such arrangements are often made as two series-connected units through which the gas is caused to flow in co-current and counter-current flows. Such an arrangement is space consuming and expensive and, besides, this type of arrangement has the drawback that the gas velocity is not constant but varies with the temperature. It is an object of the present invention to provide an efficient apparatus without said disadvantages. The invention is characterized in that the chamber is designed as a vertical cylinder fitted at the top with an axial gas inlet and equipped with an internal assembly consisting of a coaxially disposed tube forming an annular passage for the incoming gas and a cylindrical passage for the outgoing gas connected in series with said annular passage and terminating coaxially through the gas inlet, said cylindrical passage being in the form of a cone diminishing towards the outlet, in order to secure as far as possible a constant velocity of the gas passing through, and that the liquid supplying means are made up of two or more nozzle racks arranged across said passages and provided with separate supply pipes for each passage. A suitable embodiment is characterized in that the connection between the inlet casing and the chamber is made up of a conical transition piece with a reduced inlet area for the purpose of producing a momentary increase of the flow velocity to ensure a uniform distribution of the gas in the annular passage of the chamber. The apparatus can suitably be fitted with nozzle racks placed in the inlet casing for primary cooling of the gases and for flushing the outside of the gas outlet tube.

The invention will now be described more in detail with reference to the accompanying drawing in which the single figure shows an exemplifying embodiment of an arrangement according to the invention.

In the drawing 1 designates a chamber or tank in the form of a vertical cylindrical casing which by means of a conical transition piece 2 is connected to an inlet casing 3. The inlet casing is provided with an inlet opening 4 for the gas to be cleaned. 5 designates the bottom of the chamber, supported by a framework 6. According to the invention, the chamber is equipped with an internal assembly in the form of a coaxial tube 7 forming an annular passage 8 for the incoming gas and, connected to this in series, a cylindrical passage 9. The top of the tube 7 is connected by means of a tapered transition piece 10 to an outlet pipe 11 which passes coaxially through the inlet casing 3. Nozzle racks 12, 13 and 14, 15 for the supply of washing liquid are arranged across both passages. These racks are provided with separate supply pipes, 16, 17 and 18, 19, with valves 16a, 17a, 18a, 19a, respectively, for the two passages. Two nozzle racks 20 and 21 connected to a supply pipe 22 are arranged in the inlet casing 3 for primary cooling of the gases and for flushing the outside of the gas outlet tube. The above mentioned tube 7 is shaped as a cone diminishing towards the outlet, with the object of securing as far as possible a constant velocity of the gas passing through. A drain 25 is provided in the bottom of the tank.

I claim:
1. Apparatus for the wet purification and evaporative cooling of hot gases, comprising in combination, an upright cylindrical casing having at its upper end an inlet for gas, a coaxial cylindrical inner tube member defining an interior outlet passage for gas and, with said casing, forming an exterior annular passage for gas from said inlet, said tube being open at its lower end and the lower end being spaced at a distance above the lower end of the casing, said casing including a cylindrical portion, said inner tube within the cylindrical portion being formed as a cone with the large end downward to provide gas passageways of decreasing area on the outside and inside thereof, said outside and inside passageways of decreasing area in the main part of the casing normally providing increasing velocity of gas flow therethrough, and means providing at least two spray nozzle systems in both outer and inner passageways, one of said nozzle systems in said outer passageway being located adjacent the inlet end of said outer passageway with another of said nozzle systems being located intermediate the ends of said outer passageway, one of said nozzle systems in said inner passageway being located intermediate the length of said inner passageway with another of said nozzle systems being located adjacent the outlet of said inner passageway, each system having a separate supply line and a separate control means, to provide cooling of the gas and to secure as far as possible a constant velocity of gas passing through the passageways.

2. Apparatus as set forth in claim 1, further characterized by the fact that said casing is cylindrical at the upper end and of smaller diameter than the main cylindrical part and connected thereto by a conical part, said inner tube being cylindrical at the upper end within the upper cylindrical part of said casing and connected to said conical tube part by a steeper conical part defining at its smaller upper end with the casing a restricted annular passage to produce a momentary increase in gas flow velocity in order to secure a uniform distribution of gas into the annular passage in the main part of the casing.

3. Apparatus as set forth in claim 2, further characterized by the fact that spray nozzles are provided in the gas inlet to pre-cool the gas and that spray nozzles are provided at the top of said upper cylindrical tube part to flush it in the zone of departing gases.

References Cited in the file of this patent
UNITED STATES PATENTS

| | | |
|---|---|---|
| 594,480 | Leibert | Nov. 30, 1897 |
| 1,264,263 | Brassert | Apr. 30, 1918 |
| 1,687,542 | Carrier | Oct. 16, 1928 |
| 2,654,584 | Hedberg | Oct. 6, 1953 |
| 2,807,450 | Gordon | Sept. 24, 1957 |
| 2,976,949 | Murphy et al. | Mar. 28, 1961 |
| 3,064,408 | Erga et al. | Nov. 20, 1962 |

FOREIGN PATENTS

| | | |
|---|---|---|
| 343,572 | Switzerland | Feb. 15, 1960 |